United States Patent [19]

Walz et al.

[11] Patent Number: 4,644,036

[45] Date of Patent: Feb. 17, 1987

[54] CURING COMPONENT FOR SYNTHETIC RESINS WHICH CONTAIN GROUPS CAPABLE OF AMIDE FORMATION OR ESTER FORMATION WITH CARBOXYLIC ACIDS

[75] Inventors: Gerd Walz, Wiesbaden; Ernst-August Theiling, Hofheim am Taunus, both of Fed. Rep. of Germany

[73] Assignee: Hoechst Aktiengesellschaft, Fed. Rep. of Germany

[21] Appl. No.: 604,084

[22] Filed: Apr. 26, 1984

[30] Foreign Application Priority Data

Apr. 28, 1983 [DE] Fed. Rep. of Germany ....... 3315469

[51] Int. Cl.[4] .............................................. C08G 59/14
[52] U.S. Cl. .................................... 525/386; 523/402; 523/414; 525/328.2; 525/329.7; 525/330.1; 525/330.5; 525/330.6; 525/374; 528/106; 528/119; 528/121; 528/361; 528/363; 528/365; 560/25; 560/158; 560/176; 560/190
[58] Field of Search ................ 523/414, 402; 528/106, 528/119, 121, 220, 228, 361, 369, 365, 111, 350, 353, 339.3; 560/158, 176, 190, 25; 525/330.1, 533, 328.2, 329.7, 374, 330.6, 386, 330.5

[56] References Cited

U.S. PATENT DOCUMENTS 4,198,331 4/1980 Buchwalter et al. ........... 528/121 X 4,436,878 3/1984 Batzill et al. .................... 525/528 X
4,458,054 7/1984 Schmözer et al. .............. 528/121 X

OTHER PUBLICATIONS

Bergmann et al., "Michael Reaction", *Organic Reactions*, vol. 10, pp. 179–181, 447–454, & 542–543; Wiley, N.Y. 1959.
Akopyan et al., "Glutaric Acids", Chem, Abstr. 93, 94765 y (1980).
Velichko et al., "Addition of Diethyl Malonate to Acrylic Compounds", Chem., Abstr. 97, 55285e (1982).

*Primary Examiner*—Earl Nielsen
*Attorney, Agent, or Firm*—Bierman & Muserlian

[57] ABSTRACT

Michael addition products of monocarboxylic or dicarboxylic acid esters, capable of undergoing Michael addition, with compounds containing double bonds capable of undergoing Michael addition are suitable for use as a curing component for synthetic resins containing groups capable of amide formation and/or ester formation with carboxylic acids. In particular, the Michael addition products of acetoacetic esters or malonic esters with esters, amides or urea derivatives of $\alpha$, $\beta$-unsaturated monocarboxylic or dicarboxylic acids are used. The structure and the functionality of the curing component can be varied in many ways. It can be attached directly to the synthetic resin molecule, so that self-curing synthetic resins are obtained.

21 Claims, No Drawings

CURING COMPONENT FOR SYNTHETIC RESINS WHICH CONTAIN GROUPS CAPABLE OF AMIDE FORMATION OR ESTER FORMATION WITH CARBOXYLIC ACIDS

Two-component lacquers which are stable on storage and are composed of a base synthetic resin capable of amide formation or urethane formation and of a blocked, multifunctional isocyanate as the curing component have been known for a long time (for example U.S. Pat. No. 2,995,531 and British Pat. No. 873,264), and it is also known to use systems of this type in water-soluble formulations and especially in formulations for electrophoretic coating (German Offenlegungsschrift No. 2,057,799). One-component systems are also known in which a partly blocked, multifunctional isocyanate is attached to the base synthetic resin via a urethane or urea grouping (German Offenlegungsschriften Nos. 2,020,905 and 2,252,536). Although such lacquer systems have recently become established, especially for cathodic electrophoretic application of a primer, they have nevertheless the disadvantage that they require relatively high curing temperatures and that the losses on stoving are relatively high. In addition, their preparation requires handling large quantities of isocyanates, which is not unobjectionable owing to the toxicity of these compounds. It also makes it impossible to employ readily volatile alcohols, especially methanol or ethanol, as masking agents, because their urethanes are stable below about 250° C.

The curing of amino-polyether-polyols by transesterification with β-hydroxyalkyl esters of multifunctional carboxylic acids is known from European Pat. No. 12,463. This reaction too requires high temperatures, and the stoving losses are very high, the cleavage products also being not very acceptable to the environment.

In order to obtain lower stoving temperatures, it has also already been suggested to use mixed esters of malonic acid, especially ethyl alkanediol-bismalonate or ethyl trimethylolpropane-trismalonate as curing agents for base synthetic resins capable of amide formation or ester formation.

These curing agents admittedly have relatively low stoving losses, and the cleavage product formed is essentially only ethanol, which causes no problems. However, in aqueous systems, such as are used for electrophoretic coating, these curing components are sensitive to hydrolysis, so that it is difficult to keep the pH value and the MEQ value of the coating baths constant. In addition, in coating baths for cathodic electrophoretic coating, the partially saponified curing agent migrates in the form of carboxylic acid to the anode and is thus lost.

It is therefore required to provide a curing component for synthetic resins containing groups capable of amide formation and/or ester formation with carboxylic acids, by means of which curing is possible at temperatures below about 180° C., and which gives rise to minor amounts of cleavage products which pollute the environment only slightly or not at all, and which is stable for prolonged periods of time in aqueous systems, especially systems for electrophoretic coating.

The curing component for synthetic resins which contain groups capable of amide formation and/or ester formation with carboxylic acids is composed, in accordance with the invention, of the Michael addition product of a monocarboxylic or dicarboxylic acid ester, capable of undergoing Michael addition, with a compound containing at least one double bond capable of undergoing Michael addition, the Michael addition product containing, on average, at least two ester groups per molecule which are capable of transesterification or transamidation.

Compounds containing double bonds capable of undergoing Michael addition are, in principle, all α,β-unsaturated oxo compounds, such as, for example, α,β-unsaturated aldehydes and ketones. Compounds containing double bonds capable of undergoing Michael addition which are preferably used in accordance with the invention are the esters, amides and urea derivatives of α,β-unsaturated monocarboxylic or dicarboxylic acids, in particular the esters, amides and urea derivatives of acrylic acid, methacrylic acid, dimethylacrylic acid, crotonic acid, maleic acid and fumaric acid.

Monocarboxylic or dicarboxylic acid esters capable of undergoing Michael addition which are used in accordance with the invention are, in particular, the esters of malonic acid, acetoacetic acid, cyanoacetic acid and acetonedicarboxylic acid, which can also be substituted by an alkyl radical on the acid methylene groups.

Possible esterification components are preferably linear or branched alkanols containing, preferably, 1 to 8 carbon atoms, especially methanol and ethanol. It can be advantageous if the esterification component is composed in part of a branched alkanol, especially 2-ethylhexanol, since this makes it possible in some cases to counteract the tendency of a paint film to form craters when stoved. The methyl and ethyl esters produce particularly low stoving temperatures and low cleavage losses, the ethyl esters being, in addition, particularly harmless as regards cleavage products.

A large number of compounds which are Michael addition products of monocarboxylic or dicarboxylic acid esters, capable of undergoing Michael addition, with compounds containing at least one double bond capable of undergoing Michael addition, are suitable as the curing component according to the invention. As a result of the Michael addition of unsaturated compounds of a relatively low molecular weight with the said monocarboxylic or dicarboxylic acid esters, compounds are formed having a sufficiently low vapor pressure under stoving conditions for the esters not to be evolved from the paint film to be cured. Surprisingly, however, the susceptibility to hydrolysis of the esters is also drastically reduced thereby, so that they can be employed as a curing component in aqueous systems for electrophoretic coating.

In one embodiment of the invention, the curing component is a Michael addition product of a monocarboxylic or dicarboxylic acid ester, capable of undergoing Michael addition, with an ester of an α,β-unsaturated monocarboxylic or dicarboxylic acid with a polyol which preferably contains 2 to 4 hydroxyl groups.

In particular, the ester of the α,β-unsaturated acid can be selected from the group comprising alkanediol diacrylates or dimethacrylates, trimethylolpropane triacrylate or trimethacrylate and pentaerythritol tetraacrylate or tetramethacrylate. These esters are readily accessible commercial products.

Another group of curing components which have a particularly advantageous effect on the adhesion to sheet steel of paint films cured therewith and on the adhesion of coatings based on PVC to the cured paint film, embraces Michael addition products which constitute substituted urethanes or ureas of the general formula

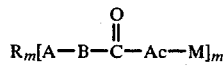  (I)

in which the individual symbols have the following meaning $R_m$ is the m-valent radical $R\text{-}(NHCO)_m$ of an isocyanate, m is an integer, at least 1, A is a chemical bond or an amidoalkylene, an O-alkylene, an amidocycloalkylene or an O-cycloalkylene radical, B is an amido group or an oxygen atom, COAc is the acyl radical of an $\alpha,\beta$-unsaturated monocarboxylic or dicarboxylic acid and M is the ester of a monocarboxylic or dicarboxylic acid, capable of undergoing Michael addition, which is attached to the molecule by Michael addition, subject to the proviso that the molecule contains at least two ester groups from the acid capable of undergoing Michael addition, and that B is an amido group if A is a chemical bond.

In an advantageous modification of the curing component described above in formula (I), A is a radical of the formula

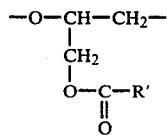  (II)

in which R' is an alkyl radical which has 9–11 carbon atoms and is branched in the $\alpha$-position relative to the carboxyl group, and B in formula (I) is an oxygen atom.

Paint films containing compounds having radicals of formula (II) frequently have less tendency to cratering during stoving and display advantageous anticorrosion properties.

Curing components according to the invention, containing, as a constituent of the molecule, the glycerol ester of a carboxylic acid which has 9–11 carbon atoms and is branched in the $\alpha$-position are obtained by preparing an unsaturated mixed ester from an $\alpha,\beta$-unsaturated dicarboxylic acid, a diol and the glycidyl ester of a carboxylic acid which has 9–11 carbon atoms and is branched in the $\alpha$-position, and carrying out an addition reaction between this mixed ester and a monocarboxylic or dicarboxylic acid ester which is capable of undergoing Michael addition.

A further class of curing components according to the invention comprises the Michael addition products of monocarboxylic or dicarboxylic acid esters, capable of undergoing Michael addition, with amides of $\alpha,\beta$-unsaturated monocarboxylic or dicarboxylic acids, for example with methylenebisacrylamide, toluylenebisacrylamide or hexamethylenebisacrylamide.

The curing agents according to the invention can be used in two-component lacquers together with a synthetic resin capable of amide formation and/or ester formation with carboxylic acids. It is equally possible to attach the Michael addition product formed from an $\alpha,\beta$-unsaturated monocarboxylic or dicarboxylic acid and a monocarboxylic or dicarboxylic acid ester, capable of undergoing Michael addition, directly to the synthetic resin molecule, whereby self-curing synthetic resins are obtained.

For example, a polyether-polyol which contains the curing component according to the invention and which can be used either as a curing agent for other synthetic resins capable of transesterification or transamidation, or on its own as a self-curing synthetic resin, can be obtained by reacting an epoxide resin with an $\alpha,\beta$-unsaturated acid and causing the resulting ester containing hydroxyl groups to undergo an addition reaction with a monocarboxylic or dicarboxylic acid ester capable of undergoing Michael addition.

Another possible means of attaching the curing component to synthetic resin molecules comprises, for example, reacting a hydroxy ester, an amino ester, a hydroxyamide or an aminoamide of an $\alpha,\beta$-unsaturated acid with a multifunctional isocyanate in such an amount that free isocyanate groups still remain, which become attached to a molecule containing hydroxyl or amino groups with the formation of a urethane or urea, and the compound thus obtained is caused to undergo an addition reaction with an ester, capable of Michael addition, of a monocarboxylic or dicarboxylic acid.

Polyether-polyols, polyester-polyols, aminopolyether-polyols, aminopolyester-polyols and polyaminopolyamides which are suitable for use as a curing component or are self-curing are obtained in this manner.

Esters, capable of Michael addition, of monocarboxylic or dicarboxylic acids can also be caused to undergo an addition reaction with unsaturated polyesters formed from $\alpha,\beta$-unsaturated dicarboxylic acids, especially maleic acid or fumaric acid, and polyols, and curing agents according to the invention or, if the unsaturated polyester contains free hydroxyl groups, self-curing synthetic resins according to the invention are obtained in this manner.

Synthetic resins which can be cured at elevated temperatures by means of the curing component according to the invention are compounds known per se which have molecular weights of about 300 to about 20,000 and which contain groups capable of ester formation or amide formation. These are, for example, polymers of olefinically unsaturated monomers containing, as a constituent, hydroxy esters and/or amino esters of olefinically unsaturated acids, such as aminoalkyl acrylates or hydroxyalkyl acrylates, or the corresponding methacrylates. A further group is constituted by the polyamino-polyamides which can be obtained from dimerized fatty acids and polyamines. Amino-polyether-polyols are obtained, for example, by reacting epoxide resins formed from polyphenols and epihalogenohydrins with primary and/or secondary amines.

Synthetic resins containing carboxylic acid or amino groups can frequently be rendered water-soluble by means of bases or acids and can be deposited anodically or cathodically from such solutions. By virtue of their resistance to hydrolysis, the curing components according to the invention are particularly suitable for use as a constituent of such electrophoretic paints. Particularly good results are obtained in conjunction with cationic amino-polyether-polyols.

The amine-containing and/or hydroxyl-containing synthetic resins are cured by transamidation and/or transesterification at elevated temperatures with the ester groups introduced by Michael addition; the temperature required depends on the alcohol component of these esters and will be correspondingly lower the lower the molecular weight of the alcohol component. Particularly low curing temperatures are therefore obtained with the methyl and ethyl esters. Curing temperatures of about 140°–160° C. can be achieved by adding catalysts which accelerate the transesterification or transamidation. Higher temperatures up to about 250° C. are possible. Examples of suitable catalysts are metal salts of organic acids, in particular zinc, lead, iron or chromium octoate or zinc, lead, iron or chromium naphthenate.

The ratio of resin to curing agent depends on the crosslinking density desired and is generally within the range from 0.2 to 2 ester groups in the curing component per hydroxyl or amino group in the synthetic resin. A corresponding ratio applies to self-crosslinking synthetic resins.

The preparation of the curing components according to the invention is effected by methods known per se.

Thus suitable adducts are obtained, for example, by a Michael addition reaction between one mole of a suitable dicarboxylic acid ester, for example dialkyl malonate or dialkyl acetonedicarboxylate, and one mole of an ester or amide of an $\alpha,\beta$-unsaturated monocarboxylic or dicarboxylic acid, for example butyl acrylate or methacrylate or dibutyl maleate or fumarate.

If the carboxylic acid ester capable of undergoing Michael addition is monofunctional, it is of course necessary for at least 2 moles of a compound containing at least two double bonds, capable of undergoing Michael addition, per molecule to be used in the addition reaction. Examples of compounds of this type are the addition products of acetoacetic acid esters or cyanoacetic acid esters with diacrylates of diols, for example ethylene glycol diacrylate, butanediol diacrylate or methylenebisacrylamide. The functionality of the curing agent can be varied within wide limits by varying the unsaturated ester or amide component and the functionality of the carboxylic acid ester capable of undergoing Michael addition. Thus, for example, a trifunctional curing agent is obtained from the trisacrylic ester of trimethylolpropane and 3 moles of an acetoacetic ester, and a hexafunctional curing agent is obtained from the same acrylic ester and 3 moles of a malonic acid ester.

The carboxylic acid ester which is capable of undergoing Michael addition can be monosubstituted on the CH-acid methylene group. In this case monoaddition products are obtained with $\alpha,\beta$-unsaturated carbonyl compounds, in particular carboxylic acid derivatives. If the said carboxylic acid ester contains an unsubstituted CH-acid methylene group, oligomeric adducts can be obtained in which both acid H atoms undergo a Michael addition with an $\alpha,\beta$-unsaturated carbonyl compound. The molecular weight and the functionality of the curing agents and the distribution within the molecule of the curing agent of ester groups capable of undergoing transesterification or transamidation can be varied and adapted to suit particular requirements by this means too.

Curing components which contain urethane or urea groups and which correspond to the formula I are obtained by reacting hydroxy esters, hydroxy amides, amides, amino esters or amino amides of $\alpha,\beta$-unsaturated acids with isocyanates and by subsequent Michael addition reaction with a monocarboxylic or dicarboxylic acid ester capable of undergoing Michael addition. Possible isocyanates for this reaction can be, above all, the substances which are available on a large industrial scale, such as toluylene diisocyanate, hexamethylene diisocyanate and isophorone diisocyanate. The formation of the urea or urethane takes place in general at moderate temperatures and can be accelerated by means of known catalysts, for example dibutyltin dilaurate. If the reaction is to be carried out in a solvent, a solvent which is inert towards isocyanates is selected, and, for the preparation of curing components which are intended to be employed in aqueous systems, it is preferable to select a water-miscible solvent, such as diethylene glycol dimethyl ether, acetone, methyl ethyl ketone or methyl isobutyl ketone.

Curing components containing amido groups are obtained if the free $\alpha,\beta$-unsaturated acid is employed instead of an ester or amide. In this case the corresponding amide is formed directly from the acid and the isocyanate with decarboxylation.

Ester-urethanes of the formula I, which are substituted in accordance with formula (II) are obtained by first esterifying the glycidyl ester of an aliphatic carboxylic acid having 9–11 carbon atoms which is branched in the $\alpha$-position with an $\alpha,\beta$-unsaturated carboxylic acid, with opening of the epoxide ring, then carrying out an addition reaction between the isocyanate and the hydroxyl group thus formed and subsequently carrying out the Michael addition reaction.

In principle, the Michael addition reaction takes place at room temperature or even below. It can be accelerated by increasing the temperature and by adding catalysts. Suitable catalysts are basic compounds, such as alkali metal hydroxides, alkali metal alcoholates and basic amino compounds.

The examples which follow serve to illustrate the invention: in the following examples parts are parts by weight and percentages (%) are per cent by weight.

Examples

I. Preparation of the curing agents

1. A mixture of 124 parts of ethylene glycol dimethacrylate, 200 parts of diethyl malonate and 12.5 parts of potassium hydroxide solution (30% solution in methanol) is heated at 100° C. for 6 hours. The proportion of double bonds is then less than 0.2%. The reaction mixture is then diluted to a solids content of 90% with ethylene glycol monoethyl ether. A pale yellow, viscous, clear liquid is obtained.

2. A mixture of 160 parts of diethyl malonate, 113.2 parts of hexanediol diacrylate and 10 parts of potassium hydroxide solution (30% solution in methanol) is heated at 120° C. for 4 hours. The proportion of double bonds is then less than 0.2%. Further processing of the reaction mixture is carried out as in Example 1. An amber-colored, moderately viscous, clear liquid is obtained.

3. A mixture of 108 parts of hydroxyethyl acrylate, 81.8 parts of a mixture of 2,4-toluylene and 2,6-toluylene diisocyanate, 3 drops of triethylamine and 21 parts of diethylene glycol dimethyl ether is heated at 60° C. for 5 hours. The isocyanate content is then less than 0.2%. 1 part of potassium hydroxide solution (30% solution in methanol) and 128 parts of diethyl malonate are then added, and the mixture is heated at 120° C. in a second stage for 6 hours. The proportion of double bonds is then less than 0.2%. Further processing is carried out as in Example 1. A moderately to strongly yellow-colored, highly viscous, clear liquid is obtained.

4. A mixture of 130 parts of ethyl acetoacetate, 132 parts of butanediol bisacrylate and 1 part of potassium hydroxide solution is heated at 120° C. for 3 hours, so that the proportion of double bonds is less than 0.2%. Further processing is carried out as in Example 1. A yellow-colored, moderately viscous, translucent liquid is obtained. Part of the acetoacetic ester can also be replaced by a corresponding molar amount of diethyl malonate.

5. A mixture of 287.5 parts of hydroxyethyl acrylate, 217.5 parts of a mixture of 2,4-toluylene and 2,6-toluylene diisocyanate, 56.1 parts of diethylene glycol dimethyl ether and 0.5 part of zinc acetylacetonate is heated at 60° C. for 6 hours until the isocyanate content is less than 0.2%. 1.2 parts of potassium hydroxide solution (30% solution in methanol) and 243.8 parts of ethyl acetoacetate are then added to the reaction mixture. In the second stage, the reaction mixture is heated at 120° C. for 5 hours. The proportion of double bonds is then less than 0.3%. Further processing is carried out as in Example 1. A slightly yellowish, viscous, clear liquid is obtained.

6. 260 parts of the glycidyl ester of a saturated fatty acid which has 9–11 carbon atoms and is branched in the α-position, having an epoxide equivalent weight of 260, are heated at 60° C. for 18 hours together with 86 parts of crotonic acid and 3 parts of completely dehydrated chromium-III octoate until the acid number is less than 2. 105 parts of isophorone diisocyanate and 0.5 part of zinc acetylacetonate are then added and the mixture is heated at 60° C. for 8 hours until the content of free isocyanate is less than 0.2%. 4 parts of tetrabutylammonium hydroxide and 160 parts of diethyl malonate are then added to the reaction mixture, which is heated at 120° C. for 6 hours. It is then diluted with ethylene glycol monoethyl ether to a solids content of 80%. A greenish, viscous, clear liquid is obtained.

7. 74 parts of acrylic acid, 87 parts of toluylene diisocyanate, 0.3 part of diazabicyclooctane, 1 part of hydroquinone and 50 parts of diethylene glycol dimethyl ether are heated to 80° C. and kept at this temperature until the acid number is less than 5. The mixture is then heated at 100° C. until carbon dioxide can no longer be detected. 80 parts of diethyl malonate, 65 parts of ethyl acetoacetate and 2 parts of KOH are then added and the reaction mixture is heated at 120° C. for 8 hours until the double bond content is less than 0.4%. The mixture is then diluted with ethylene glycol monoethyl ether to a solids content of 70%. A brown-colored, cloudy, very viscous liquid is obtained.

8. 516 parts of diethyl maleate are heated at 170° C. together with 128 parts of ethylene glycol, 1 part of hydroquinone and 1 part of butyl titanate, and the ethanol liberated is removed by distillation. 390 parts of acetoacetic ester and 20 parts of choline are then added at 120° C., and the mixture is kept at 120° C. for 7 hours. It is then diluted with ethylene glycol monoethyl ether to a solids content of 80%. A brownish-colored, viscous, slightly cloudy liquid is obtained.

9. 200 parts of maleic anhydride, 62 parts of ethylene glycol and 0.5 part of diazabicyclooctane are heated slowly to 100° C. The mixture is kept at 100° C. until free anhydride groups can no longer be detected. 520 parts of the glycidyl ester of a monocarboxylic acid which has 9–11 carbon atoms and is branched in the α-position are then added, and the mixture is heated at 100° C. until the acid number ($H_2O$) is less than 2. 320 parts of diethyl malonate are then added dropwise and 2 parts of sodium methylate are also added. The temperature is raised slowly to 120° C. and the mixture is kept at this temperature for 5 hours until the content of double bonds is less than 0.2%. The solids content of the mixture is then adjusted to 80% with diethylene glycol dimethyl ether. An amber-colored, viscous, slightly cloudy liquid is obtained.

10. 260 parts of the glycidyl ester according to Example 9 are added to 4,000 parts of an oligomeric, unsaturated polyester based on fumaric acid, neopentylglycol and trimethylolpropane, having a molecular weight of about 800 and an acid number of 20 and present in the form of a 70% strength solution in diethylene glycol dimethyl ether, and the mixture is heated at 120° C. until the acid number is less than 2. 900 parts of ethyl acetoacetate and 50 parts of benzyltrimethylammonium hydroxide are then added, and the mixture is heated at 120° C. until the content of double bonds is less than 0.2%. A very highly viscous, amber-colored, slightly cloudy liquid is obtained.

11. 184 parts of N,N'-methylene bisacrylamide, 260 parts of ethyl acetoacetate, 111 parts of dimethyl diethylene glycol ether and 3 parts of KOH (30% solution in methanol) are heated slowly to 140° C. and kept at this temperature until the content of double bonds is less than 0.2%. A viscous, amber-colored, cloudy liquid is obtained.

12. 360 parts of the diglycidyl ether of bisphenol A, 144 parts of acrylic acid and 2 parts of dehydrated chromium-(III) octoate are heated slowly to 100° C. and kept at this temperature until the acid number is less than 5. The mixture is then diluted with ethylglycol, so that an 80% strength solution is formed.

260 parts of ethyl acetoacetate and 3 g of KOH (30% solution in methanol) are then added, and the mixture is heated at 120° C. until the content of double bonds is less than 0.5%. A self-curing synthetic resin is obtained.

II. Preparation of the amine-containing polymers

| Polyepoxide-amine adduct A | |
|---|---|
| 38.6 parts of dimethylaminopropylamine<br>16.1 parts of 2-ethylhexylamine<br>79.2 parts of ethylene glycol monoethyl ether | Mixture I |

Mixture I is heated to a temperature of approx. 143° C., until a slight reflux is obtained, in a 2 l flask equipped with a reflux condenser, a stirrer and electrical resistance heating.

317 parts of bisphenol A epoxide resin having an epoxide equivalent weight of 480 are dissolved in 136 parts of ethylene glycol monoethyl ether, and the mixture is added dropwise slowly, in the course of 1 hour, to mixture I at 143° C. 130 parts of epoxidized soya oil having an epoxide equivalent weight of 260 are then added dropwise in the course of 1 hour at 143° C., and the mixture is then kept at 143° C. for a further 10 hours. A 70% strength solution of an epoxide-amine adduct in ethylene glycol monoethyl ether is obtained.

Polyepoxide-amine adduct B 683 parts of a bisphenol A epoxide resin having an equivalent weight of 480 are dissolved in 339 parts of ethylglycol, and the mixture is heated to 80° C. 50.4 parts of diethanolamine and 57.8 parts of diisopropylaminoethylamine are then added dropwise simultaneously. The reaction mixture is kept at 80° C. for 3 hours.

Amine adduct C

A polyaminoamide is prepared from dimeric fatty acids and diethylenetriamine by known methods, so that a polyaminoamide having the following characteristic values is formed.

| Solids content: | 100% |
|---|---|
| Amine number: | 300 |
| Acid number: | approx. 2 |
| Viscosity at 75° C.: | 3500 mPa · s |

The polyaminoamide is dissolved in dimethyl diethylene glycol ether to form a 70% strength solution.

III. Curing the resins 300 parts of titanium dioxide and 50 parts of lead silicate are added to 1,000 parts of a 70% strength solution of the basic polymer A. The mixture is ground on a triple roll mill. A corresponding procedure is also applied to the basic polymers B and C.

The composition of the electrophoresis baths, the curing conditions and the properties of the cured products can be seen in Table 1 below.

The electrophoresis baths are prepared by first homogenizing, by means of a high-speed stirrer, the amount indicated in Table 1 of the pigmented, basic polymer A, B or C with the indicated amount of curing agent, catalyst and formic acid, and then slowly adding demineralized water until the solids content of the electrophoresis bath is approx. 19%.

The electrophoretic deposition is effected by pouring the 19% strength electrophoresis liquors into a plastic trough equipped with a stainless steel anode and having a metal sheet with a zinc phosphate bonderized film connected as the cathode, and by effecting deposition by applying, for 2 minutes, a direct voltage which is in each case 50 volts below the rupture voltage. The layer thickness of the films deposited is regulated by adding ethylene glycol monohexyl ether to the electrophoresis baths so that the layer thickness of the stoved films is between 18 and 25 μm, except in Example 22, where 50 μm is obtained. The films deposited are rinsed with demineralized water and are then stoved, as indicated in Table 1. The metal sheet thus coated had the properties in respect of paint technology indicated in Table 1.

TABLE 1

The properties in respect of paint technology of stoved films deposited from electrophoresis baths.

| Use Example No. | Pigmented, base resin Amount of A | Amount of B | MEQ+ | Curing agent from Example | Amount, parts | Lead Octoate, metal content 24%, parts | Zinc octoate, metal content 8%, parts | Stoving conditions minutes/°C. | Erichsen indentation, mm | Corrosion test as specified in ASTM B 117/6 + (up to 2 mm creeping at the cross cut) hrs |
|---|---|---|---|---|---|---|---|---|---|---|
| 13 | 1350 | — | 30 | 1 | 195 | 30 | — | 20/160 | 7.2 | >500 |
| 14 | 1350 | — | 30 | 2 | 175 | 30 | — | 20/180 | 6.7 | >400 |
| 15 | 1350 | — | 35 | 3 | 175 | — | 30 | 20/170 | 6.3 | >600 |
| 16 | 1350 | — | 35 | 4 | 234 | 15 | 20 | 20/200 | 7.0 | >600 |
| 17 | 1350 | — | 35 | 5 | 292 | 15 | — | 20/160 | 5.2 | >550 |
| 18 | 1350 | — | 35 | 6 | 230 | 30 | — | 20/150 | 5.3 | >400 |
| 19 | 1350 | — | 35 | 7 | 220 | 15 | 10 | 20/170 | 4.8 | >600 |
| 20 | 1350 | — | 35 | 8 | 240 | 30 | — | 20/190 | 6.7 | >700 |
| 21 | — | 1350 | 55 | 2 | 175 | 20 | — | 20/170 | 6.4 | >650 |
| 22 | — | 1350 | 60 | 4 | 246 | 30 | 5 | 20/190 | 6.9 | >700 |
| 23 | — | 1350 | 50 | 3 | 175 | — | 30 | 20/180 | 7.6 | >400 |
| 24 | — | 1350 | 60 | 8 | 240 | 10 | 10 | 20/150 | 4.3 | >500 |
| 25 | 1350 parts of amine adduct C | | 60 | 3 | 300 | 30 | — | 20/160 | 8.0 | >600 |

+MEQ = Milliequivalents of formic acid per 100 parts of binder solids

We claim:

1. A curing component for synthetic resins containing groups capable of amide formation and/or ester formation with carboxylic acids, which is composed of the Michael addition product of a monocarboxylic or dicarboxylic acid ester, capable of undergoing Michael addition, with a compound containing at least one double bond capable of undergoing Michael addition selected from the group consisting of polyarcylates bisacrylamides and urea derivatives and which on average, contains, per molecule, at least 2 ester groups capable of transesterification or transamidation.

2. A curing component as claimed in claim 1, wherein the compound containing double bonds capable of undergoing Michael addition is an ester, an amide or a urea derivative of an α,β-unsaturated monocarboxylic or dicarboxylic acid.

3. A curing component as claimed in claim 1, wherein the compound containing double bonds capable of undergoing Michael addition is an ester, an amide, or a urea derivative of acrylic acid, methacrylic acid, dimethylacrylic acid, crotonic acid, maleic acid and/or fumaric acid.

4. A curing component as claimed in claim 1, wherein the carboxylic acid ester capable of undergoing Michael addition is an ester of malonic acid, acetoacetic acid, acetonedicarboxylic acid or cyanoacetic acid or of a C-alkyl derivative of these acids.

5. A curing component as claimed in claim 1, wherein the carboxylic acid ester capable of undergoing Michael addition is a methyl, ethyl or 2-ethylhexyl 6. A curing component as claimed in claim 1, which is the Michael addition product of a monocarboxylic or dicarboxylic acid ester, capable of undergoing Michael addition with an ester of an α,β-unsaturated monocarboxylic or dicarboxylic acid with a polyol.

7. A curing component as claimed in claim 1, wherein the compound containing at least one double bond capable of undergoing Michael addition is an ester of an α,β-unsaturated acid selected from the group comprising an alkanediol diacrylate or dimethacrylate, trimethylolpropane triacrylate or trimethacrylate, or pentaerythritol tetraacrylate or tetramethacrylate.

8. A curing component as claimed in claim 1, wherein the Michael addition product is a substituted urethane or a substituted urea of the general formula

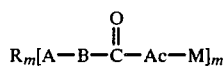

in which
R$_m$ is the m-valent radical R-(NHCO-)$_m$ of an isocyanate,
m is an integer, at least 1,
A denotes a chemical bond or an amidoalkylene, an O-alkylene, an amidocycloalkylene or an O-cycloalkylene radical,
B is an amido group or an oxygen atom,
COAc is the acyl radical of an α,β-unsaturated monocarboxylic or dicarboxylic acid and
M denotes the ester of a monocarboxylic or dicarboxylic acid which has been caused to undergo an addition reaction with the molecule designated above by means of Michael addition to the molecule, subject to the proviso that the molecule contains at least two ester groups from the acid capable of undergoing Michael addition, and that B is an amido group if A designates a chemical bond.

9. A curing component as claimed in claim 1, wherein the Michael addition product is a substituted urethane of the general formula

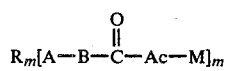

in which
R$_m$ is the m-valent radical R—(NHCO—)$_m$ of an isocyanate
m is an integer, at least 1
B is an oxygen atom
COAc is the acyl radical of an α,β-unsaturated monocarboxylic or dicarboxylic acid,
M is the ester of a monocarboxylic or dicarboxylic acid which has undergone a Michael addition to the COAc portion of the molecule and
A is a radical of the formula $$-\mathrm{O-CH-CH_2} \atop {\mathrm{CH_2} \atop \mathrm{O-CR'} \atop \mathrm{O}}$$ (II)

which R' is an alkyl radical with 9–11 carbon atoms which is branched in the α-position relative to the COO-group,
with the proviso that the m in formula (I) is at least 2 if M is the ester of a monocarboxylic acid.

10. A curing component as claimed in claim 1, which composed of the Michael addition product of a monocarboxylic or dicarboxylic acid ester, capable of undergoing Michael addition, with a mixed ester formed from an α,β-unsaturated dicarboxylic acid, a diol and the glycerol ester of a carboxylic acid which has 9–11 carbon atoms and is branched in the α-position.

11. A curing component as claimed in claim 1, wherein the Michael addition product is derived from an amide of the general formula R$_n$[A-Ac]$_n$ (III)

in which
R$_n$ is the radical of an n-valent amine,
A is an amido group,
Ac is the acyl radical of an α,β-unsaturated monocarboxylic or dicarboxylic acid and
n is an integer, at least 1.

12. A curing component as claimed in claim 1, which is composed of the Michael addition product of 2 moles of a monocarboxylic or dicarboxylic acid ester, capable of undergoing Michael addition, with methylenebisacrylamide, toluylenebisacrylamide or hexamethylenebisacrylamide.

13. A curing component as claimed in claim 1, wherein the Michael addition product is derived from an ester or amide of a polyether-polyol, polyester-polyol, aminopolyether-polyol, aminopolyester-polyol or polyamino-polyamide with an α,β-unsaturated monocarboxylic or dicarboxylic acid, and the addition product still contains in each case free hydroxyl groups and/or primary or secondary amino groups.

14. A curing component as claimed in claim 1, wherein the Michael addition product is derived from an ester of an epoxide with an α,β-unsaturated monocarboxylic or dicarboxylic acid.

15. A self-curing synthetic resin containing aliphatic hydroxy or amino groups or both, and containing, chemically bound to the synthetic resin molecule, the Michael addition product of a monocarboxylic or dicarboxylic acid ester, capable of undergoing Michael addition, with an α,β-unsaturated monocarboxylic or dicarboxylic acid.

16. The use of compounds which have been obtained by a Michael addition reaction between esters of monocarboxylic or dicarboxylic acids capable of undergoing Michael addition and esters, amides or urea derivatives of α,β-unsaturated acids, and which, on average, contain, per molecule, at least two ester groups capable of transesterification or transamidation, as curing agents for synthetic resins containing groups capable of ester formation and/or amide formation with carboxylic acids.

17. Use as claimed in claim 16, wherein the Michael addition product is chemically bound to the synthetic resin molecule.

18. A self-curing synthetic resin containing aliphatic hydroxyl or amino groups or both, and containing, chemically bound to the synthetic resin molecule, based on aminopolyetherpolyol or an unsaturated polyester containing hydroxyl groups or amino groups or both, the Michael addition product of a monocarboxylic or dicarboxylic acid ester, capable of undergoing Michael addition, with an α,β-unsaturated monocarboxylic or dicarboxylic acid.

19. A curable mixture comprising (A) a resin containing a plurality of hydroxyl groups or primary or secondary amino groups, and (B) a cross-linking agent which is the Michael additon product of a monocarboxylic or dicarboxylic acid ester capable of undergoing Michael addition, with a compound containing at least one ethylenic double bond capable of undergoing Michael addition, the cross-linking agent having at least 2 ester groups capable of transesterification or transamidation.

20. A curable mixture comprising (A) a resin containing a plurality of hydroxyl groups, primary or secondary amino groups or a combination thereof and (B) a cross-linking agent which is the Michael addition product of a monocarboxylic or dicarboxylic acid ester capable of undergoing Michael addition, with a compound containing at least one ethylenic double bond capable of undergoing Michael addition, the cross-linking agent having at least 2 ester groups capable of transesterification or transamidation.

21. A heat curable mixture which comprises:
(A) an organic resin containing a plurality of hydroxyl groups, primary or secondary amino groups or a combination thereof, and
(B) a crosslinking agent which is the Michael addition product of a monocarboxylic or dicarboxylic acid ester possessing acid methylene groups or acid methylene groups substituted by an alkyl radical, said ester being capable of undergoing Michael addition, with a compound containing at least one ethylenic double bond capable of undergoing Michael addition, the crosslinking agent having at least two ester groups capable of transesterification or transamidation.

* * * * *